United States Patent [19]

Allen

[11] Patent Number: 5,451,316

[45] Date of Patent: Sep. 19, 1995

[54] AEROBIC SEWAGE TREATMENT SYSTEM

[76] Inventor: Douglas M. Allen, 2761 Pleasant St., Ashland, Ky. 41102

[21] Appl. No.: 19,658

[22] Filed: Feb. 19, 1993

[51] Int. Cl.$^6$ ............................................. C02F 3/22
[52] U.S. Cl. ................... 210/195.4; 210/197; 210/214; 210/532.2
[58] Field of Search ............. 210/195.4, 197, 219, 210/532.2

[56] References Cited

U.S. PATENT DOCUMENTS

| | | | |
|---|---|---|---|
| 2,987,186 | 6/1961 | Burgoon et al. | 210/197 |
| 3,053,390 | 9/1962 | Wood | 210/219 |
| 3,204,768 | 9/1965 | Daniel | 210/219 |
| 3,883,427 | 5/1975 | Oldham et al. | 210/195.4 |
| 4,093,549 | 6/1978 | Wilson | 210/195.4 |
| 5,110,464 | 5/1992 | Ettlin | 210/219 |

*Primary Examiner*—Thomas Wyse
*Attorney, Agent, or Firm*—Joseph G. Nauman

[57] ABSTRACT

An aerobic sewage treatment method and system includes a tank divided by a baffle into at least a treatment chamber and a settling chamber. A return flow pipe at the normal liquid level, from the settling chamber into the aerating chamber, has on its treatment chamber side a tee fitting aimed to the side of the treatment chamber, along the baffle separating it from the settling chamber. Floating particles near the settling chamber discharge thus flow back into the treatment chamber for further aeration and reduction. Flow through such return pipe is induced by a stream from the aerating unit directed against the surface of the turned end of the return pipe, whereby some of that flow moves along the pipe and draws a return flow into the aerating chamber. The stream for causing this return flow is obtained from the discharge of an improved aerating unit which discharges a few directed streams, as opposed to an annular stream of greater velocity but lesser total mass flow. This multiple stream flow is obtained by a unique deflector incorporated into the housing of the aerating unit, near its top and just above several circumferentially spaced discharge openings through the upper side wall of the housing. Rotational positioning of the unit within the treatment chamber locates the desired flow streams from these openings to interact with the return pipe from the settling chamber.

6 Claims, 3 Drawing Sheets

FIG. 6

| DATE | BOD (mg/l) | SS (mg/l) | pH | DO (mg/l) | AIR TEMP (C) | WATER TEMP (C) | WATER USAGE (gpd) |
|---|---|---|---|---|---|---|---|
| 9/23 | 18.00 | 1.00 | 6.84 | 4.00 | 22 | | 253 |
| 24 | 15.00 | 10.00 | 7.08 | 4.00 | 17 | | 305 |
| 25 | 5.00 | 3.00 | 6.75 | 3.40 | 18 | | 198 |
| 26 | 11.00 | 4.00 | 6.94 | 3.00 | 19 | | 181 |
| 27 | 12.00 | 6.00 | 7.23 | 3.00 | 28 | | 169 |
| 30 | 4.00 | 4.00 | 7.50 | 2.00 | 28 | | 279 |
| 10/1 | 7.00 | 3.00 | 7.13 | 3.60 | 28 | | 194 |
| 2 | 10.00 | 3.00 | 7.25 | 2.20 | 28 | | 158 |
| 3 | 4.00 | 6.00 | 7.50 | 4.20 | 27 | | 230 |
| 4 | 3.00 | 2.00 | 7.10 | 7.00 | 29 | | 424 |
| 7 | 10.00 | 4.00 | 6.97 | 2.80 | 13 | | 489 |
| 8 | 5.00 | 6.00 | 7.10 | 4.00 | 19 | | 343 |
| 9 | 4.00 | 5.00 | 7.13 | 4.30 | 23 | | 281 |
| 10 | 7.00 | 5.00 | 7.09 | 1.10 | 22 | | 167 |
| 11 | 11.00 | 9.00 | 6.88 | 5.00 | 17 | | 191 |
| 14 | 11.00 | 10.00 | 6.41 | 1.20 | 23 | | 173 |
| 15 | 16.00 | 10.00 | 7.00 | 2.00 | 14 | | 252 |
| 16 | 5.00 | 1.00 | 7.27 | 4.00 | 15 | | 160 |
| 17 | 8.00 | 5.00 | 7.08 | 5.80 | 19 | | 150 |
| 18 | 12.00 | 5.00 | 6.76 | 8.00 | 26 | | 148 |
| 21 | 18.00 | 8.00 | 6.76 | 5.00 | 22 | | 183 |
| 22 | 16.00 | 13.00 | 6.80 | 4.40 | 26 | | |
| 23 | 19.00 | 22.00 | 6.85 | 1.20 | 25 | | |
| 24 | 17.00 | 10.00 | 6.73 | 3.60 | 29 | | |
| 25 | 19.00 | 19.00 | 6.80 | 2.00 | 29 | | |
| 28 | 6.00 | 7.00 | 6.40 | 6.60 | 25 | 18 | |
| 29 | 5.00 | 5.00 | 7.01 | 7.00 | 27 | 23 | |
| 30 | 9.00 | 10.00 | 6.33 | 1.20 | 25 | | |
| 31 | 11.00 | 9.00 | 6.37 | 2.30 | 22 | | |
| 11/1 | 10.00 | 12.00 | 7.38 | 2.00 | 22 | | |
| 4 | 9.00 | 12.00 | 6.94 | 1.00 | 1 | | |
| 5 | 14.00 | 8.00 | 7.16 | 1.00 | 4 | | |
| 6 | 14.00 | 10.00 | 7.47 | 1.10 | 12 | 14 | |
| 7 | 12.00 | 11.00 | 7.36 | 1.00 | 9 | 14 | |
| 8 | 15.00 | 8.00 | 7.05 | 2.60 | 4 | 14 | |
| 11 | 12.00 | 5.00 | 6.79 | 2.20 | 9 | 8 | |
| 12 | 9.00 | 3.00 | 7.15 | 1.00 | 8 | 14 | |
| 13 | 7.00 | 10.00 | 7.15 | 0.50 | 12 | 13 | |
| 14 | 7.00 | 15.00 | 6.94 | 2.40 | 17 | | |

AEROBIC SEWAGE TREATMENT SYSTEM

The present invention relates to improvements in an aerobic sewage treatment system, and particularly to improvements in the type of system shown in the inventor's prior U.S. Pat. No. 4,620,925 issued 4 Nov. 1986.

BACKGROUND OF THE INVENTION

FIG. 1 of that patent illustrates an aerobic sewage treatment system as used in residential and small commercial installations. The treatment tank is divided into a pretreatment sludge chamber into which sewage discharged from the plumbing system is supplied through an inlet line, an aeration chamber in which the sewage is mixed or stirred and wherein air is mixed into the sewage during this process, and a settling chamber which communicates with the aeration chamber, receives the treated sewage from it, and from which the treated sewage flows into the discharge pipe, thence into a leach bed.

The submerged motor, propeller type of aerator described in said patent produced an upward flow from near the bottom of the aerating chamber, through a tubular housing surrounding the motor, and against a deflector which diverted the flow substantially around 360° of the housing toward all walls of the chamber. This however does not necessarily produce the best over-all agitation and mixing within the chamber because the power requirements placed on the motor are relatively high, yet the flow is diverted so widely that it quickly reduces in velocity and does not stir the liquid in farther regions of the chamber from the housing.

Furthermore, it has been noted that, depending on the load upon the entire system, small particulate matter may rise to the top of the settling chamber and flow outward in the discharge, whereas it is desirable that a minimum of particulate matter leave the tank in the final outflow Therefore, it is desirable to induce a certain amount of recirculation flow from the settling chamber into the aerating chamber, to maximize the dissolution of particles into the liquor before discharge from the system.

SUMMARY OF THE INVENTION

The present invention can be characterized by the following features. A return flow pipe is provided, at the normal liquid level, from the settling chamber into the treatment or aerating chamber. On the aerating chamber side of this pipe, there is a turn, preferably a T-fitting, which is aimed at one or both of the side walls of the treatment chamber, e.g. along the baffle separating it from the settling chamber. This allows floating particles near the settling chamber discharge to flow back into the treatment chamber for further aeration and reduction.

Flow through such return pipe is induced by directing a stream from the aerating unit against the surface of the turned end of the return pipe, whereby some of that flow moves along the pipe and draws a return flow into the aerating chamber.

The stream for causing this effect is obtained from the discharge of the improved aerating unit, which discharges at its top a few directed streams, as opposed to an annular stream, of greater velocity but lesser total mass flow thus, the flow capacity of the aerating unit may be reduced somewhat to extend its projected operating life. This multiple stream flow is obtained by a unique deflector incorporated into the housing of the aerating unit, near its top and just above several circumferentially spaced discharge openings through the upper side wall of the housing. Rotational positioning of the unit within the aerating chamber locates the desired flow streams from these openings to interact with, and increase or decrease flow through, the aforementioned return pipe.

Therefore, the principal object of the invention is to provide a method of aerobic treatment of sewage, and a system operating according to that method, which is capable of meeting Class I effluent quality requirements as defined by NSF definitions and EPA Secondary Treatment Guidelines; to provide such a method and system in which a tank divided into aerobic treatment and settling chambers by a baffle, includes a return from the settling chamber to the treatment chamber for floating particulate matter, and flow through such return is induced by utilizing available energy from the discharge flow of an improved aerating/recirculating treating unit to induce return flow of particulate matter collecting at or near the top of the settling chamber; and to provide such an improved aerating/recirculating unit which produces directed flows of aerated sewage in the process of inducing a recirculating flow within the treatment chamber.

Other objects and advantages of the invention will be apparent from the following description, the accompanying drawings and the appended claims.

BRIEF DESCRIPTION OF THE DRAWINGS

FIG. 6 is a chart showing test results for the system of the invention.

DESCRIPTION OF THE PREFERRED EMBODIMENT

Figure 1:
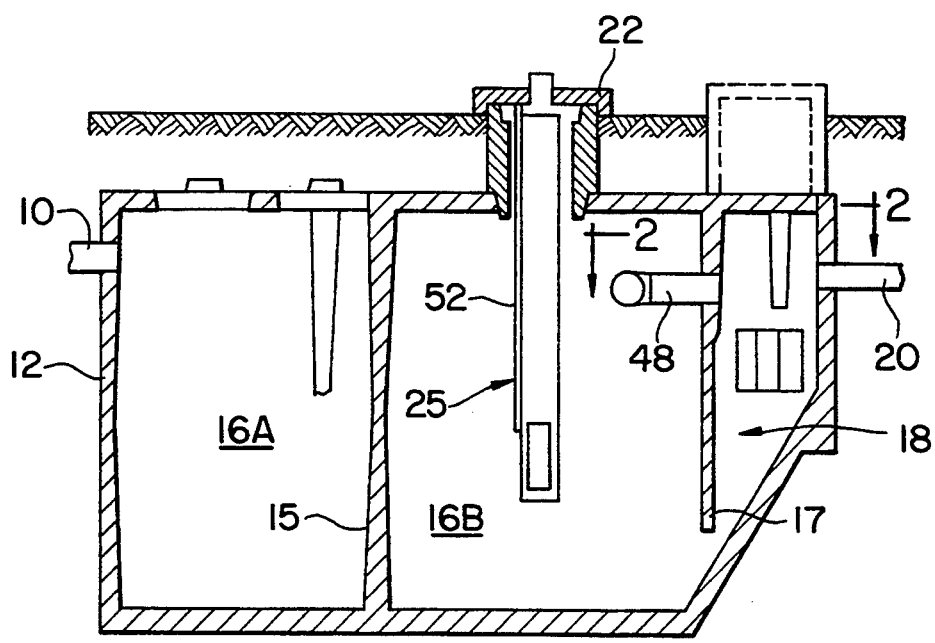
FIG. 1 is a diagrammatic side view, with parts of the tank wall broken away, showing the over-all arrangement of the invention.
Figure 2:
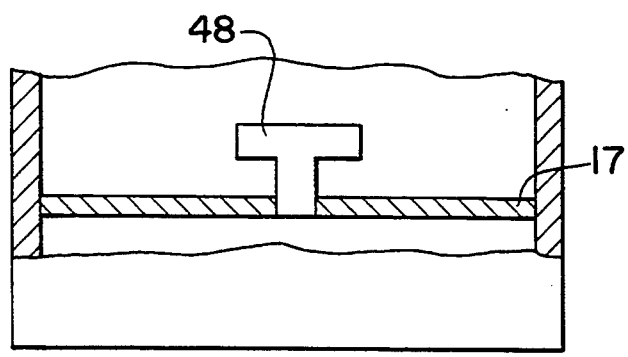
FIG. 2 is a partial top view of the end of the tank at which the settling chamber is located with a section of the top broken away.

Referring to FIGS. 1 and 2, the present invention is directed to aerobic sewage treatment systems in which a sewage pipe discharges through an outlet 10 into a typical below-ground tank 12. The tank may be divided by a baffle 15 into a sludge pre-treatment chamber 16A and an aerobic treatment chamber 16B, although the sludge chamber is optional. The treatment chamber in turn is partially separated by a baffle 17 from a settling or clarifying chamber 18. Effluent flows from chamber 18 into discharge pipe 20 which exits near the top of chamber 18, defining the liquid level therein. The tank is provided with an access opening normally closed by cover 22, from which an aerating/recirculating unit 25 is suspended. A second access opening and its cover, shown in outline over chamber 18, is optional.

In a typical residential installation pre-treatment chamber 16A provides primary treatment, removing settleable and floating solids, and has a volume of about 475 gallons. Biochemical oxidation occurs in the aerobic treatment chamber 16B, through the action of the motor driven aerator unit 25, this treatment chamber having a volume of about 600 gallons. The mixed settleable solids are separated by gravity from the effluent in clarifying chamber 18, which has a volume of about 125 gallons, and returned to aeration chamber 16B by gravity.

Figure 3:
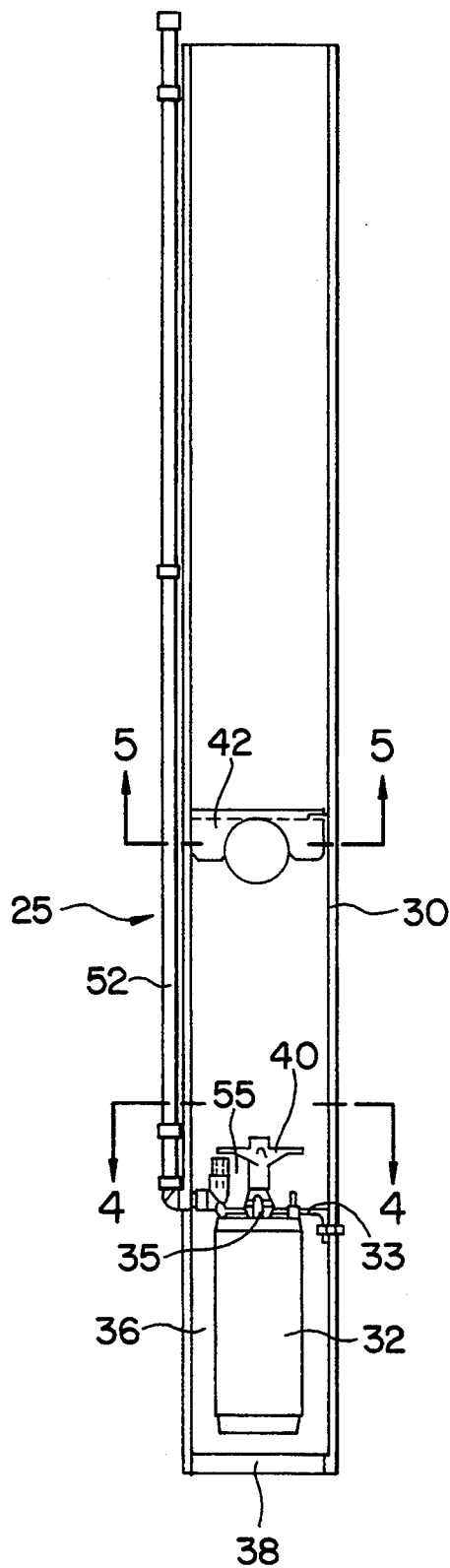
FIG. 3 is a side view of the aerating unit which is provided by the invention.
Figure 5:
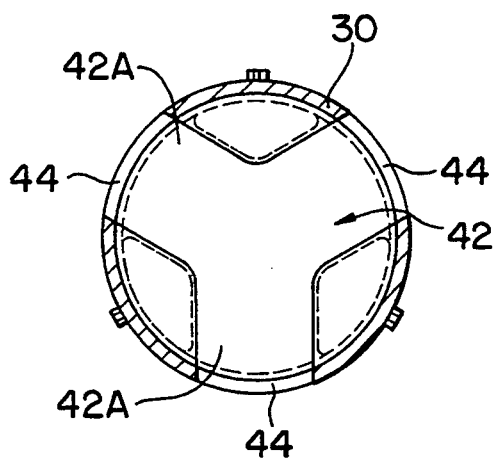
FIG. 5 is a cross-sectional view through the housing at the region of the flow deflector and discharge openings.
Figure 4:
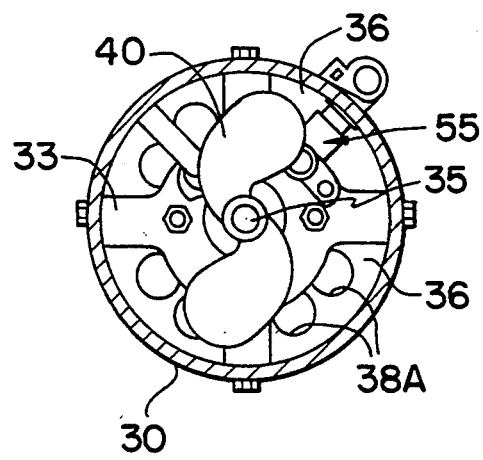
FIG. 4 is an enlarged view showing the motor upper end, its support bracket, and the propeller in elevation showing the surrounding tubular housing in cross-section, and showing the openings in the protective guard at the lower end of the unit.

The aerating/recirculating unit 25 is an improved version of the aerating/mixing device disclosed in applicant's prior U.S. Pat. No. 4,620,925 issued 4 Nov. 1986. The improved unit 25 includes a cylindrical flow directing housing 30 which surrounds and supports an enclosed fractional horsepower motor 32. Housing may conveniently be fabricated from six inch (internal diameter) PVC pipe. As shown particularly in FIG. 3, the motor is suspended within the housing by a bracket 33, with the short projecting motor shaft 35 extending through an aperture in bracket 33. The shape of bracket 33 defines, with the inner wall of housing 30, large openings 36 to allow the mixed liquor to flow upward from the bottom of housing 30, and between the housing and motor, in response to rotation of the propeller 40 which is fixed to shaft 35. At the bottom of housing 30 flow enters through a protective screen 38 having relatively large openings 38A, which may be for example about one inch in diameter. The screen can be fabricated as a molded plastic part of inverted shallow cup shape (see FIGS. 3 and 4) which is fastened to the interior lower end of housing 30.

The flow proceeds upward beyond propeller 40 to a deflector 42, which is supported within housing 30 a predetermined distance above propeller 40. There are a plurality of openings 44 in the housing wall, at the level of deflector 42, through which the flow discharges radially of housing 30 in several streams into the liquor in aerator chamber 16B. The deflector is a fabricated plastic member shaped into a number of half-circular flow guides 42A according to the number of said openings, which flow guides merge at the center of deflector 42, and thus function also as a flow divider. In a preferred arrangement, there are three such openings 44 with their centers 120 degrees apart around housing 30, and the flow of liquid through them results in streams within, but just below the top of, the body of liquid, which streams extend substantially across the liquid surface in chamber 16B.

Approximately at the level of these streams there is a tee fitting 48 extending through baffle 17 and facing toward the sides of chamber 16B, e.g. generally along the face of baffle 17. By appropriate angular positioning of aerating unit 25, one of the aforementioned streams issuing from openings 44 is directed at tee fitting 48. In impinging against the tee and diverting outward around its open ends, that stream acts to induce a reverse flow through the fitting of liquid from the adjacent top of the liquid pool in chamber 18. The reverse flow thus created brings floating particles from within chamber 18 back into aerating chamber 16B, and this minimizes the discharge of such particulate matter through the effluent outlet at discharge pipe 20.

Housing 30, as mentioned, may be constructed of suitable noncorrosive material, such as a six inch plastic pipe, and is suspended from cover 22. The housing pipe is of a length to locate openings 44 at the proper level within the tank, as shown, just below the normal pool surface° Housing 30 may be suspended by suitable straps (as shown in said prior Pat. No. 4,620,925, or preferable a pipe of extended length may be used, whereby the upper end of such pipe is simply mounted within the access opening. Motor 32 is submerged in liquid, which is flowing whenever the motor is under power, thereby obtaining sufficient cooling to insure a long reliable operation. An insulated electrical power supply line 50 extends from the top of housing 30 to motor 32, and an air inlet tubing 52 also extends from the exterior of the tank, through cover 22, to a location near the underside of propeller 40, whereby air is drawn into and mixed with the flow of liquor induced by rotation of propeller 40.

The propeller inherently produces a small region of cavitation, and good propeller design dictates that this region be minimized to the greatest extent possible, but nevertheless some small amount of cavitation will exist. This region of cavitation is used as an air induction location 55, to draw air into the mixed liquor flow passing by the motor/propeller unit by precisely mounting the lower open end of air induction tube 52 with respect to the cavitation region.

Normally such aerobic digesting units utilize a timer controller (not shown) in the power supply circuit to the fractional horsepower motor, in order to provide an on/off cycle of operation, since effective aerobic decomposition usually does not require continuous operation. Typically, a timer/controller will cycle the unit on about every twenty minutes and operate for periods of about fifteen minutes; the length and frequency of this period can be varied in accordance with the needs of a particular system. In operation, the fractional horsepower motor will rotate at a speed in the order of 3200 r.p.m. and will drive a propeller having a tip-to-tip length of approximately four inches, centered within the tubular housing which has an inner diameter of six inches. This combination produces a flow rate through the aerator of about 150 gallons/minute.

Thus, in operation propeller 40 causes a flow through a portion of the pool of sewage in a generally toroidal path which enters the lower end of housing 30 through screen 38, which functions as a protective device against large objects (sticks, disposable diapers, etc. now readily soluble, which may have inadvertently entered the system. The flow proceeds between the tubular housing and the motor, past the propeller 40 where an appropriate amount of air is drawn into the flow by reason of the below ambient pressure in the cavitation region. This air is immediately mixed with the flowing liquor by reason of the rapidly rotating propeller, and the aerated flow then proceeds upward against diverter 42 and divides into the several streams moving radially outward through the liquor in chamber 16B. In actual practice, it has been observed that one of the several streams issuing from openings 40 contains more air than the others, due to the localized entry of air off-axis within the unit 25, and in spite of the mixing action of the propeller. If desired, this stream may be directed away from the tee fitting 48 so the stream impinging on that fitting has a greater mass flow impact, thus affording some variation in the flow into the clarifying chamber 18.

The nature of the recirculating flow, and the location of the open bottom end 32 of housing 30 above the floor of chamber 16B is such that the entire pool is agitated and stirred. Baffle 17 shields clarifying chamber 18 from this turbulence to allow settling of particles in chamber 18. The entire aerating/recirculating unit is of a size that can readily be inserted into existing tanks and suspended at the proper elevation above the tank bottom, within the normal pool of liquor therein, as can readily be seen from FIG. 1. The unit can be readily removed for maintenance or replacement, and is of such simple and straightforward construction that it will provide years of reliable service under normal operating conditions.

The particulate return circuit from the top of the settling chamber into the treatment chamber is essentially passive in nature, and utilizes the available energy from the discharge flow of the aerating/recirculating treating unit to induce return flow of particulate matter collecting at or near the top of the settling chamber.

SYSTEM TEST RESULTS

A test installation of a system built according to the invention was operated over a six month period, which included seasonal changes, handling the sewage directly from a residence of a three person family, which included part time a fourth member of college age. This residence is located in the mid-west United States. Samples of effluent were taken five days per week and tested for $BOD_5$ by EPA method 405.1, Suspended Solids (SS) by EPA method 160.2, pH by EPA method 150.1, Fecal Coliform by SM 99c, and dissolved oxygen by EPA method 360.1. In addition, ambient and liquid temperatures were recorded to analyze the system's cold weather performance ability.

The aerating/recirculating unit employed had a design rating of 500 gallons per day. Actual water usage for this residence, recorded over a longer period than the complete testing, ranged from 158 gallon/day to 489 gallon/day, with higher usages in part related to garden watering.

FIG. 6 is a reproduction of a chart showing the four tests identified above, plus ambient and water temperatures, four the six month test period. These results verified that the system meets the Class I effluent quality requirements as defined by National Standards Foundation Standard 40, Individual Aerobic Wastewater Treatment Plant. This requirement is that the treatment facility shall meet EPA Secondary Treatment Guidelines for $BOD_5$, SS, and pH, which are:

$BOD_5$ and SS . . . Arithmetic mean of all effluent samples collected in a period of 30 consecutive days shall be <mg/l and >85% removal. Arithmetic mean of all effluent samples collected in a period of seven consecutive days shall be <45 mg/l.

pH . . . Effluent values shall remain between 6.0 and 9.0.

Effluent shall be tested three times during the six month evaluation period for color, odor, oily film, and foam. The effluent shall be diluted 1:1000 with distilled water. Plants tested for Class I effluent characteristics shall not exceed:

Color—15 units

Threshold odor—nonoffensive

Oily film—nonvisible evidence other than air bubbles

Foam—none.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. An aerobic sewage digestion system, comprising a tank having a floor, sides, and a top, a baffle in said tank separating said tank into a treatment chamber and a settling chamber separated from said treatment chamber by said baffle and having a return passage defined by said baffle and said floor for returning settled solids into said treating chamber, means providing a sewage inlet into said treatment chamber and an outlet from said settling chamber adjacent the top thereof at the normal liquid level in said tank, an elongated tubular housing having an open bottom end and at least one laterally facing upper opening and means for supporting said housing in a vertical orientation within a pool of sewage contained in said treatment chamber and in predetermined spaced relation to said floor of said treatment chamber, power operated means in said housing for inducing a flow of the sewage upwardly through said housing to move sewage liquor upward through said housing from said floor of said treatment chamber and to discharge the flow through said laterally facing opening for inducing a circulating flow of the sewage liquor outwardly of said housing across the top of the liquid in said treatment chamber and thence downwardly along said sides of said treatment chamber, means for mixing air into the recirculating flow of sewage liquor through said housing whereby such air is carried along the circulating flow throughout said treatment chamber, a tubular fitting extending through said baffle adjacent the liquid level in said settling chamber and into said treatment chamber and having an open end facing toward one of said sides of said treatment chamber between which said baffle extends, said housing being oriented in said treatment chamber to direct the flow from said laterally facing opening against said tubular fitting in a manner to induce flow of liquid from the top of said settling chamber into said treatment chamber, whereby particulate matter collecting on the surface of liquid in said settling chamber is returned into said treatment chamber.

2. An aerobic sewage digestion system as defined in claim 1, wherein said power operated means for inducing flow through said housing is a motor supported within said housing defining a flow space therebetween and a propeller driven by said motor to draw sewage from the open bottom of said housing and expel the sewage flow through said laterally facing opening.

3. An aerobic sewage digestion system as defined in claim 2, wherein said housing includes a screen at said lower end to prevent large objects from entering said housing and said flow space.

4. An aerobic sewage digestion system as defined in claim 1, wherein said tubular fitting is a T-fitting having opposed open ends facing oppositely along said baffle, and the flow from said laterally facing opening is directed against said T-fitting to divert said flow generally parallel to said open ends of said T-fitting to induce flow therefrom into said treatment chamber.

5. An aerobic sewage digestion system as defined in claim 1, wherein said tubular housing is an elongated generally cylindrical member suspended in a vertical orientation in said tank and having a plurality of laterally facing top openings located beneath but near to the top of the level of the sewage pool in said treatment chamber, said power operated means for inducing flow comprising an electric drive motor having a closed casing mounted within said tubular housing in spaced relation thereto defining a passage therebetween, said motor having a rotatable output shaft extending upwardly through said casing and a propeller within said housing having a hub fixed to said shaft and operable when rotated to move sewage liquid upward through said housing from said floor of said treatment chamber and resulting in an area of cavitation adjacent said hub, deflector means supported in said housing immediately above said lateral openings and arranged to divide flow from said propeller outward through said top openings into said treatment chamber, a power supply line extending to said motor, said means for mixing air into the sewage flow comprising an air induction tube having an open end located in close proximity to said propeller hub at the area of cavitation and extending to the exterior of the chamber above the liquid level in said treatment chamber whereby rotation of said propeller causes flow of liquid upwardly through said housing around said motor and against said deflector means thereby drawing air through said induction tube and mixing air into the recirculating flow of sewage liquor within said treatment chamber induced by said propeller.

6. For use in an aerobic sewage digestion system having a tank divided into a treatment chamber and a settling chamber separated from said treatment chamber, said treatment chamber having a floor, sides, and a top, sewage being directed through an inlet into said treatment chamber and discharging through an outlet from said settling chamber adjacent the top thereof;

an improved aerating and recirculating apparatus comprising an elongated generally cylindrical housing having an bottom end including a liquid inlet opening and a plurality of side outlet openings spaced substantially above said bottom end, means for supporting said housing in a vertical orientation within a pool of sewage contained in the treatment chamber and in predetermined spaced relation to the floor of the treatment chamber, an electric drive motor having a closed casing mounted within said housing in spaced relation thereto defining a passage therebetween extending from said bottom end of said housing to said side outlet openings, said motor having a rotatable output shaft extending therefrom, a propeller having a hub fixed to said shaft and within said housing and operable when rotated to move sewage liquor upward through said passage in said housing from said floor of said treatment chamber and resulting in an area of cavitation adjacent said hub, deflector means supported in said housing immediately above said side outlet openings and arranged to divide and direct flow from said propeller outward through said top openings as discrete flows across the body of sewage in said treatment chamber, a power supply line extending to said motor, an air induction tube having an open end located in close proximity to said hub at the area of cavitation and extending to the exterior of the chamber above the level of liquid therein whereby rotation of said propeller causes flow of liquid upwardly through said housing around said motor against said deflector means thereby drawing air through said induction tube and mixing air into the recirculating flow of sewage liquor within said treatment chamber induced by said propeller.

* * * * *